United States Patent

[11] 3,632,481

[72] Inventors Roland P. Hammond
 879 W. Outer Drive, Oakridge, Tenn. 37830;
 Roscoe Van Winkle, 3049 Kingston Pike, Knoxville, Tenn. 37919
[21] Appl. No. 11,224
[22] Filed Feb. 13, 1970
[45] Patented Jan. 4, 1972

[54] CRITICAL VELOCITY, UNINTERRUPTEDLY FLOWING BRINE IN MULTISTAGE DISTILLATION SYSTEM
 9 Claims, 4 Drawing Figs.
[52] U.S. Cl. ................................................. 203/11, 203/88, 203/DIG. 17, 202/173, 159/2 MS
[51] Int. Cl. .................................................. B01d 3/06
[50] Field of Search .................................... 202/173, 174; 203/10, 11, 88, DIG. 17; 159/2 MS

[56] References Cited
 UNITED STATES PATENTS

| | | | |
|---|---|---|---|
| 3,336,966 | 8/1967 | Goeldner | 159/2 MS |
| 3,213,000 | 10/1965 | Ewing | 202/173 |
| 3,172,824 | 3/1965 | Mulford | 203/11 |
| 3,431,179 | 3/1969 | Starmer | 203/11 X |
| 3,442,765 | 5/1969 | Levite | 202/173 |
| 2,979,443 | 4/1961 | Frankel | 203/11 X |

Primary Examiner—Norman Yudkoff
Assistant Examiner—David Edwards
Attorneys—Ernest S. Cohen and Howard Silverstein ABSTRACT: A multistage flash system, having as many as 100 stages or more per atmosphere of pressure drop, wherein preheated sea water flows uninterruptedly through the series of stages at a substantially constant linear velocity at least equal to its critical velocity. Inexpensive sheet materials can be employed as the stage partitions. Each partition terminates above the flowing distilland, and a movable flap is connected to its bottom. The free end of each flap wipes or floats on the surface of the flowing distilland. Uninterrupted flow of collected distillate, from stage to stage, is provided in the same manner.

INVENTORS
ROLAND P. HAMMOND
ROSCOE VAN WINKLE

BY *Ernest S. Cohen*
*H. Howard Silverstein*
ATTORNEYS

CRITICAL VELOCITY, UNINTERRUPTEDLY FLOWING BRINE IN MULTISTAGE DISTILLATION SYSTEM

The invention relates to multistage flash evaporation or distillation of distillable or concentratable liquids such as sea water.

Presently, multistage flash distillation or evaporation systems are designed so as to provide a substantial pressure difference between adjacent stages; and the flow of distilland from one evaporator chamber to the next lower pressure chamber is regulated by controlled orifices and/or weirs which maintain a liquid seal between chambers and prevent vapor from passing therebetween. There are usually about 10–15 stages per atmosphere of pressure drop.

Many disadvantages exist in such a system. For example, the stage partitions must be well sealed and sufficiently strong to withstand relatively high interstage pressure differentials. Although these partitions would not have to be quite as strong, and the thermodynamic efficiency of such a prior art system would be theoretically improved by increasing the number of stages for a given temperature span (i.e., a given pressure drop), in practice this number is sharply limited by the high cost of constructing the individual sealed compartments and the connecting orifices or valves, and by the necessity of maintaining sufficient pressure drop between stages to overcome orifice-produced resistance to flow and thereby maintain flow without excessive depth of liquid.

Such a requisite relatively high interstage pressure differential creates other problems. That is, unstable flow conditions tend to occur wherein distilland may back up and flood one stage or blow by another. Elaborate orifice control means are necessary to prevent and correct such occurrences. Furthermore, due to the high pressure differential, when brine flows into a stage, boiling occurs violently, almost explosively, at the entrance. This results in further complications in designing a suitable control orifice. Additionally, violent flashing may cause entrained liquid to pass with vapor to the stage's condenser and thereby contaminate the distillate, unless a vapor-liquid separator is provided in each stage.

Still further, the presence of orifices and/or weirs causes distilland to accelerate as it enters a stage, and to decelerate as it approaches the exit orifice, which constant changes in fluid velocity result in pressure losses in the system. A further wasteful loss of pressure head is caused by a frequently employed turnover device which brings the lower portion of the relatively deep layer of distilland in each stage to the liquid surface so as to aid in vaporization thereof.

We have now developed a unique and improved multistage flash system. Basically our invention comprises uninterruptedly flowing preheated distilland, in a shallow stream at a velocity at least equal to its critical velocity, through a multistage flash system. By the term "uninterrupted," it is meant that there are no weirs, flow restrictions, or other transverse partitions or projections opposing the flow of distilland as it passes from the first evaporation stage to the last. Flow control is provided only at the inlet to the first stage so that the linear velocity of the distilland is maintained substantially constant throughout its passage through the system. As many as 100 stages per atmosphere of pressure drop are provided.

Since the pressure drop between stages is much smaller than that encountered in prior art multistage flash systems, the stage partitions need not be strong nor well sealed, and can simply consist of thin sheets of metal or plastic hung in a curtainlike manner. To allow uninterrupted flow of distilland, while at the same time providing an adequate vapor seal for a relatively low interstage pressure drop, the bottoms of the curtains terminate above the flowing distilland and a movable flap is connected at one end to the bottom of each curtain while the other free end of the flap wipes or floats on the surface of the flowing distilland and offers negligible resistance to flow.

In the condensing section of each stage an open distillate collection trough or channel can be provided wherein the distillate travels uninterruptedly through the series of stages in the same manner and direction as the distilland, so that the distillate can flash downstream and impart some of its heat to the counterflowing condensing medium.

It is therefore an object of the present invention to provide a multistage flash system (i.e., apparatus and process) for carrying out distillation or evaporation in a simplified manner requiring a minimum of structural details.

Another object is to provide a multistage flash system having an increased thermodynamic efficiency.

A still further object is to provide such a system which is inherently stable in operation.

A still further object is to distill sea water in such a system.

Other objects and advantages will be obvious from the following more detailed description of the invention in conjunction with the drawings in which.

In describing the invention, the feed will be referred to as sea water although other distillable or concentratable liquids can be treated in the same manner.

In the practice of the invention, sea water is first heated to a predetermined temperature (e.g., 240° to 260° F.). This can be accomplished in the prior art manner by employing the sea water as the condensing medium in the multistage module of the present invention and then further heating it with another power source such as steam. Thereafter, it flows through the inlet to the first evaporator stage of the system. At the inlet to this stage is the only flow control means such as a valve (not shown) for the module.

Figure 1:
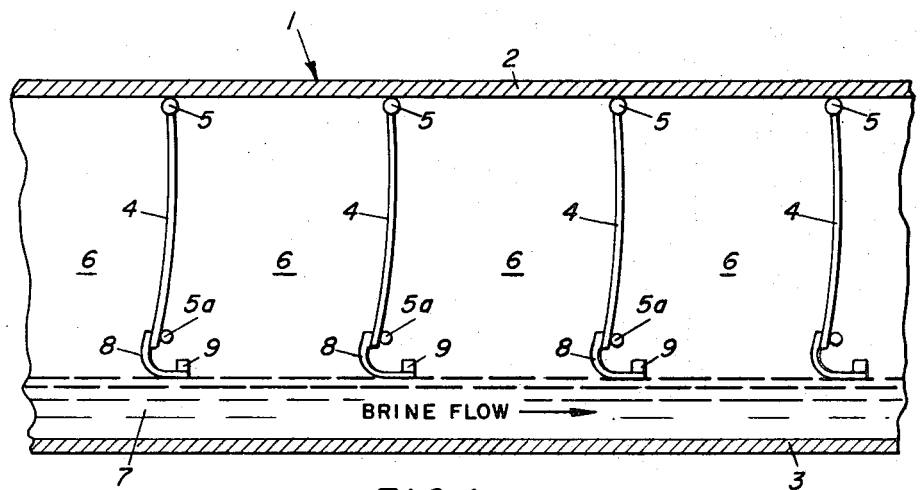
FIG. 1 is a fragmentary cross-sectional-type view of the apparatus of the present invention.

Referring now to FIG. 1 of the drawings, reference numeral 1 designates the multistage flash module of the present invention defined by a ceiling 2 and floor 3. Disposed within the module are a plurality of stage partitions or curtains 4 fabricated of, for example, sheet metal or plastic. The curtains can be rigid or flexible as long as they can be constrained to remain in a transverse position. In the particular embodiment of FIG. 1 each curtain is fabricated of flexible material held in place between fixed transverse rods 5 and 5a in the module's upper and lower portions, respectively. The curtains may tend to flex, as shown, due to the pressure difference along the module. Other means can obviously be provided for supporting a curtain such as a rigid, picturelike frame which drops into grooves in the module's sidewalls.

Although not shown in FIG. 1, each stage (designated by reference numeral 6) includes a condensing section in its upper portion, or is connected to one in the prior art manner.

Brine flow is in the horizontal or near horizontal direction, in the usual manner, from the high pressure-temperature end of the module to the lower pressure-temperature end. Inside and between stages there is no resistance or obstruction to flow such as that provided by weirs, orifices, or other transverse obstructions. Instead, curtains 4 terminate above the flowing brine or sea water 7, and one end of a movable flap 8, fabricated of a flexible material such as a sheet of neoprene, is attached to the bottom of each curtain. The free end of each flap wipes or floats on the flowing distilland. To hold the flap 8 in contact with the surface of the distilland, it may be necessary to attach a weight 9 to the downstream face of the flap. No waves are created by the flap, and it automatically follows variations in distilland level.

Figure 2:
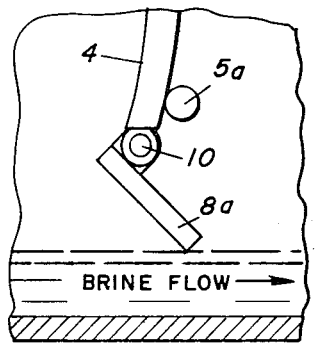
FIG. 2 is a fragmentary view of an alternative embodiment of FIG. 1.

An alternative way of designing the flap is shown in FIG. 2. Therein, flap 8a is fabricated from a more rigid material such as a rigid plastic. Pivotal movement of the flap is provided by a hinged connection 10 at the bottom of curtain 4. Other feasible means of supporting and positioning the flap can obviously be employed.

Since the flap offers negligible resistance to liquid flow, the sea water flows uninterruptedly, from stage to stage, in shallow layer, substantially constant velocity fashion. As such it can flow at critical and supercritical velocities (defined in "Fluid Mechanics," 3rd Edition, R. C. Binder, Prentice-Hall, Inc., N.J., pages 276–277). Such a velocity allows maximum surface exposure of internal liquid since the flow is shallow and all the available pressure drop is used to produce internal shear; thus turbulent vortices within the liquid occur primarily in the vertical plane and carry heat rapidly to the surface. Furthermore, since flow is maintained at least at critical velocity, then the distilland, at each point during its travel through the module, is unaffected by conditions downstream, and hence the flow is inherently stable.

After its entry into the module, the distilland does not flash in the prior multistage flash sense of releasing vapor explosively upon sudden entry through a flow-controlling orifice into a chamber of lower pressure. Instead the elements of this invention provide for a continuous release of heat by turbulent exposure of the internal liquid to the surface of a shallow, rapidly flowing stream.

As stated previously, as many as 100 or more stages are provided per atmosphere of pressure drop along the module. This number of stages would be inoperable with stages constructed as in the prior art. If the number of stages is decreased to less than about 30 per atmosphere of pressure drop, it becomes increasingly difficult to maintain wiping contact of the flap without interfering with liquid flow. Preferably, at least 40 stages are employed per atmosphere of pressure drop.

Figure 4:
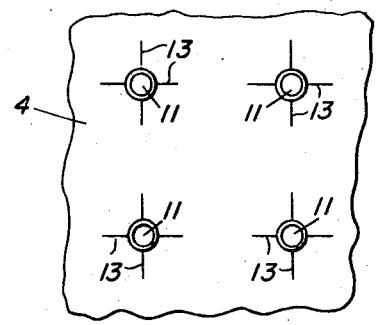
FIG. 4 is a fragmentary side view of an element shown in FIG. 3.
Figure 3:
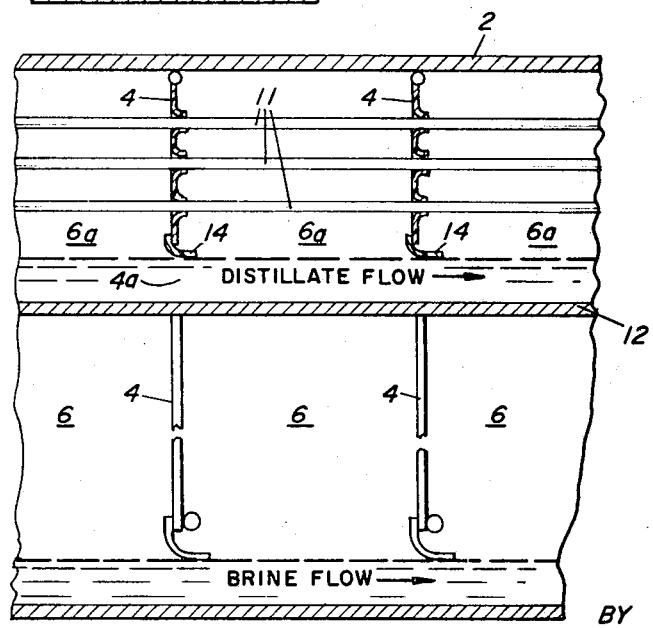
FIG. 3 is a fragmentary cross-sectional view of condensing means of the present invention.

Referring to FIG. 3, numeral 6a designates the condensing sections or zones that can be employed in the upper portion of stages 6 of the multistage flash module of the present invention. A bundle of tubes 11 pass straight through partitions 4, in the prior art manner, together with a distillate collection trough or channel 12. Since the partitions are fabricated from relatively thin material, and the stages need not be well sealed from one another, the partition openings for the tubes 11 can be provided simply by a plurality of slits 13, as shown in FIG. 4.

Referring again to FIG. 3, distillate channel 12 extends through an opening 4a in partitions 4. At the top of this opening is attached a movable flap 14. The free end of the flap floats on or wipes the flowing distillate in the same manner that flap 8 in the evaporator section of each stage wipes the flowing distilland. Flap 14 thereby maintains a sufficient vapor seal between adjacent stages, yet offers negligible resistance to flow. As such, the flow of distillate is uninterrupted and in the form of a rapidly moving shallow stream, which travels at critical or supercritical velocity. In this manner the distillate flows parallel to and in the same direction as the distilland through the module, and flashes in the downstream stages thereby giving up some of its heat to the condensing medium, usually cold sea water, which flows countercurrently through tubes 11.

In the practice of the invention parallel distilland flow channels can be provided within a module, and the module can be sloped slightly downward in the direction of flow to assist in starting flow and maintaining rapid liquid movement. Auxiliary well-known elements such as pumps, sea water intake means, deaeration means, noncondensible gas-venting means, and heat-supply means which are common in this art are also employed.

In the construction of the apparatus, for convenience, instead of constructing the apparatus as one module, it can consist of a plurality of modules coupled together.

Absence of flow restrictions to the distilland in the system of the present invention permits high speed, shallow flow with maximum internal shearing rate, and thus rapid release of vapor. Without the need for orifices in series, an inherently stable operation is provided. In addition, vapor-liquid separators are not necessary in view of the absence of violent flashing; and turnover devices are not required because the distilland stream is shallow and flowing at critical or supercritical velocities. Further, by maintaining uninterrupted flow, all the available head due to both the slope of the vessel and the pressure difference between entrance and outlet is used to produce internal shearing and turbulence of the liquid which carries heat to the surface for release. None of the pressure head is consumed in wasteful momentum changes such as acceleration and decelerations essential to passing through a valve or orifice, which changes tend to increase the internal heat of the liquid, rather than releasing it. Still further, since the chamber curtains or partitions 4 need not be perfect vapor seals, especially in view of the relatively low interstage pressure differential (e.g., 100 or more stages per atmosphere of pressure drop), they can be constructed of thin, inexpensive material, such as plastic or sheet metal.

What is claimed is:

1. A multistage flash distillation or evaporation process comprising uninterruptedly flowing preheated distilland through a series of flash stages as a shallow, flashing stream at a velocity at least equal to its critical velocity, said flowing distilland traveling at said velocity essentially throughout its passage through said series of flash stages; wherein flow control of said distilland to and through said series is provided substantially only at the inlet to said series; and wherein said series consists of at least 40 flash stages per atmosphere of pressure drop.

2. The process of claim 1 wherein each of said stages has a condensing zone in the upper portion thereof; wherein a condensing medium flows through said condensing zones countercurrent to said flowing distilland; wherein collected condensate in each condensing zone is conveyed serially through said zones in a path parallel to and concurrently with said stream of distilland; and wherein said collected condensate flows uninterruptedly through the series of condensing zones as a shallow flashing stream at a velocity at least equal to its critical velocity, said flowing distilland traveling at said velocity essentially throughout its passage through the series of condensing zones.

3. The process of claim 1 wherein said distilland is sea water.

4. The process of claim 1 wherein there are at least 100 flash stages per atmosphere of pressure drop.

5. The process of claim 4 wherein said distilland is sea water.

6. In a multistage flash evaporator wherein a plurality of partitions extend downward from the upper section of the evaporator to define a series of chambers under decreasing pressure and temperature through which preheated distilland flows and flashes, the improvement comprising means to uninterruptedly flow said preheated distilland through said series as a shallow, flashing stream at a velocity at least equal to its critical velocity essentially throughout its travel through said series, said means comprising movable flexible flap means attached to the bottom of each partition, said bottom of said partitions terminating above said flowing distilland, the free end of each flap means extending downstream; means to maintain the upstream face of said flap means in wiping contact with the surface of said flowing distilland, said upstream face being essentially planar so that said flap offers negligible resistance to distilland flow, the only flow control means for said distilland through said series being provided at the entrance to said series, and wherein said series consists of at least 40 chambers per atmosphere of pressure drop.

7. The apparatus of claim 7 wherein there are at least 100 chambers per atmosphere of pressure drop, and wherein said partitions are flexible.

8. The apparatus of claim 6 further including a condensing section in the upper portion of each chamber, condensing tube means extending through said chamber partitions and serially through said condensing sections; distillate collection trough means extending through openings in said chamber partitions and serially through said condensing sections; means to uninterruptedly flow said distillate through said series of condensing sections as a shallow, flashing stream at a velocity at least equal to its critical velocity essentially throughout its travel through said series, said distillate flow means comprising movable flap means attached to the top of said openings, said top of said openings being above said flowing distillate, the free end of said flap means extending downstream; means to maintain said flap means in wiping contact with the surface of said flowing distillate so as to offer negligible resistance to distillate flow.

9. The apparatus of claim 8 wherein there are at least 100 chambers per atmosphere of pressure drop, and wherein said partitions are flexible.

* * * * *

UNITED STATES PATENT OFFICE
CERTIFICATE OF CORRECTION

Patent No. 3,632,481  Dated January 4, 1971

Inventor(s) Roland P. Hammond, et. al.

It is certified that error appears in the above-identified patent and that said Letters Patent are hereby corrected as shown below:

On the cover sheet, insert -- [73] Assignee  The United States of America as represented by the Department of the Interior -- .  Column 4, line 30, cancel "distilland" and insert -- distillate -- .

Signed and sealed this 12th day of December 1972.

(SEAL)
Attest:

EDWARD M. FLETCHER, JR.
Attesting Officer

ROBERT GOTTSCHALK
Commissioner of Patents